(12) United States Patent
Rivera

(10) Patent No.: US 11,059,324 B2
(45) Date of Patent: Jul. 13, 2021

(54) ELECTRICALLY ACTUATED APPARATUS AND METHOD FOR TIRE REPLACEMENT

(71) Applicant: Paul Rivera, Orlando, FL (US)

(72) Inventor: Paul Rivera, Orlando, FL (US)

( * ) Notice: Subject to any disclaimer, the term of this patent is extended or adjusted under 35 U.S.C. 154(b) by 88 days.

(21) Appl. No.: 16/561,664

(22) Filed: Sep. 5, 2019

(65) Prior Publication Data

US 2020/0016929 A1    Jan. 16, 2020

Related U.S. Application Data

(63) Continuation-in-part of application No. 15/901,536, filed on Feb. 21, 2018, now Pat. No. 10,875,150, which is a continuation-in-part of application No. 14/858,037, filed on Sep. 18, 2015, now abandoned.

(51) Int. Cl.
*B60B 29/00* (2006.01)
*B60S 9/02* (2006.01)
*B60S 5/00* (2006.01)

(52) U.S. Cl.
CPC ............ *B60B 29/00* (2013.01); *B60S 5/00* (2013.01); *B60S 9/02* (2013.01)

(58) Field of Classification Search
CPC ............ B60B 29/00; B60S 5/00; B60S 9/02
See application file for complete search history.

(56) References Cited

U.S. PATENT DOCUMENTS

| | | | |
|---|---|---|---|
| 5,722,641 A | 3/1998 | Martin et al. | |
| 6,313,248 B1* | 11/2001 | Boyd | C08G 73/12 |
| | | | 526/262 |
| 6,527,254 B1 | 3/2003 | Prevete | |
| 6,910,680 B1* | 6/2005 | Geller | B60S 9/12 |
| | | | 254/418 |
| 6,913,248 B1 | 7/2005 | Schmitz | |
| 6,991,221 B1 | 1/2006 | Rodriguez | |
| 7,294,797 B2 | 11/2007 | Erickson | |
| 8,424,848 B1 | 4/2013 | Hawkins, Jr. | |
| 8,919,739 B1 | 12/2014 | Romero et al. | |
| 9,126,568 B1 | 9/2015 | Reid, Jr. | |
| 9,326,568 B2* | 5/2016 | Hung | B29D 5/02 |

FOREIGN PATENT DOCUMENTS

| | | |
|---|---|---|
| EP | 1 184 243 A1 | 3/2002 |
| WO | 2006081533 A2 | 8/2006 |

* cited by examiner

*Primary Examiner* — John C Hong
(74) *Attorney, Agent, or Firm* — Wiggin and Dana LLP; Gregory S. Rosenblatt; Thomas M. Landman

(57) ABSTRACT

An tire replacement apparatus is disclosed that has an electric motor with a drive shaft and a first gear concentrically connected to the drive shaft. The first gear may connect to a symmetrical bolt locking gear array having several bolt locking gears arranged such that each bolt locking gear rotates in the same direction that the first gear rotates. Each bolt locking gear may have a cylindrical hole at its center. The cylindrical hole may be outlined with an inner spiral thread, which connects to a set of power bolts that are outlined in an outer spiral thread which interlocks with the inner spiral thread.

14 Claims, 15 Drawing Sheets

ELECTRICALLY ACTUATED APPARATUS AND METHOD FOR TIRE REPLACEMENT

CROSS-REFERENCE TO RELATED APPLICATIONS

This patent application is a continuation-in-part of U.S. patent application Ser. No. 15/901,536 titled "Apparatus and Method for Automatic Tire Replacement," that was filed on Feb. 21, 2018 that is in turn a continuation-in-part of U.S. Ser. No. 14/858,037, titled "Automatic All Wheel Hydraulic Power Jack System," that was filed on Sep. 18, 2015 and is now abandoned. The disclosures of U.S. Ser. No. 14/858,037 and U.S. Ser. No. 15/901,536 are incorporated by reference herein in their entireties.

BACKGROUND OF THE DISCLOSURE

Motor vehicle (automobiles, trucks, buses and the like) tire replacement apparatus typically include a manually actuated air jack and a manual tire wrench. A tire and wheel assembly is replaced by placing the air jack below a chassis of the motor vehicle, manually pumping the jack to raise the motor vehicle such that the tire and wheel assembly does not touch the ground and may be removed. A motorist uses the tire wrench to loosen a set of lug nuts that retain the wheel to bolts on an axle. Removing the lug nuts from the bolts enables removal of the wheel and tire assembly. The defective wheel and tire assembly wheel is removed and replaced with a new assembly. The lug nuts are replaced onto the bolts and tightened to secure the replacement assembly.

The present method and apparatus for changing a tire require significant manual labor and require the motorist to carry several separate tools in a motor vehicle at all times. Wheel replacement requires the motorist to exit the vehicle for an extended period of time and manually remove and replace lugs on a wheel, which is not always feasible or convenient. In some cases, the motorist may not have the tools or expertise necessary to replace a wheel when necessary. Calling an auto repair service to make a service call make be expensive and time consuming.

There is a need for an apparatus and method to replace a tire that requires minimal time and expertise. With such an apparatus and method, any motorist may replace a damaged tire without significant physical exertion. Further there is a need for a vehicle mounted apparatus and method for automatically replacing a tire that does not require external tools. With such an apparatus and method, any motorist may replace a damaged tire whenever necessary anywhere and at any time.

There are a number of vehicle mounted hydraulic car lifts for changing a vehicle tire. Representative lift systems are disclosed in U.S. Pat. No. 5,722,641, titled "Vehicle Mounted Tire Changing System," to Martin et al.; U.S. Pat. No. 6,991,221 B1, titled "Automatic Jacking System for an Automotive Vehicle," to Rodriguez; and U.S. Pat. No. 8,424,848 B1, titled "Vehicle Jack for Use on Vehicles to Change Tires and for Other Purposes," to Hawkins, Jr. Each of U.S. Pat. Nos. 5,722,641; 6,991,221 and 8,424,848 B1 is incorporated by reference herein in its entirety.

SUMMARY OF THE DISCLOSURE

In accordance with one aspect of the disclosure, an automatic tire replacement apparatus has a hydraulic fluid line with a first end and a second end. The first end is connected to a hydraulic fluid reservoir via a reservoir actuator and the second end is connected to a hydraulic fluid retainer. At least one hydraulic piston is provided that has a hollow barrel with an inner volume and an outer volume, a piston, and a piston rod with a first end and a second end within the inner volume of the hydraulic piston. The apparatus also contains a power rod that is at least partially within the outer volume of the hollow barrel. The hollow barrel is connected to the hydraulic fluid retainer via an inner piston actuator on the inner volume and an outer piston actuator on the outer volume. The power rod has a first end, a second end and spiral thread. The first end of the power rod is connected to the second end of the piston rod. A power bolt that has a set of inward facing pins engaging the spiral thread and the second end of the power rod.

In accordance with another aspect of the disclosure, there is provided an automatic tire replacement apparatus that has an electric motor having a drive shaft and a first gear concentrically connected to the drive shaft where the first gear connects to a symmetrical array of bolt locking gears and directional gears. Each bolt locking gear rotates in the same direction that the first gear rotates. Each bolt locking gear has a cylindrical hole at its center, the cylindrical hole is outlined with an inner spiral thread which connects to a set of power bolts. Each power bolt is outlined in an outer spiral thread which may interlock with the inner spiral thread of the bolt locking gears such that rotation of any gear in the apparatus may require or cause rotation of the other gears in the apparatus.

DETAILED DESCRIPTION

An apparatus and method for automatically replacing a tire are described below.

Figure 1:
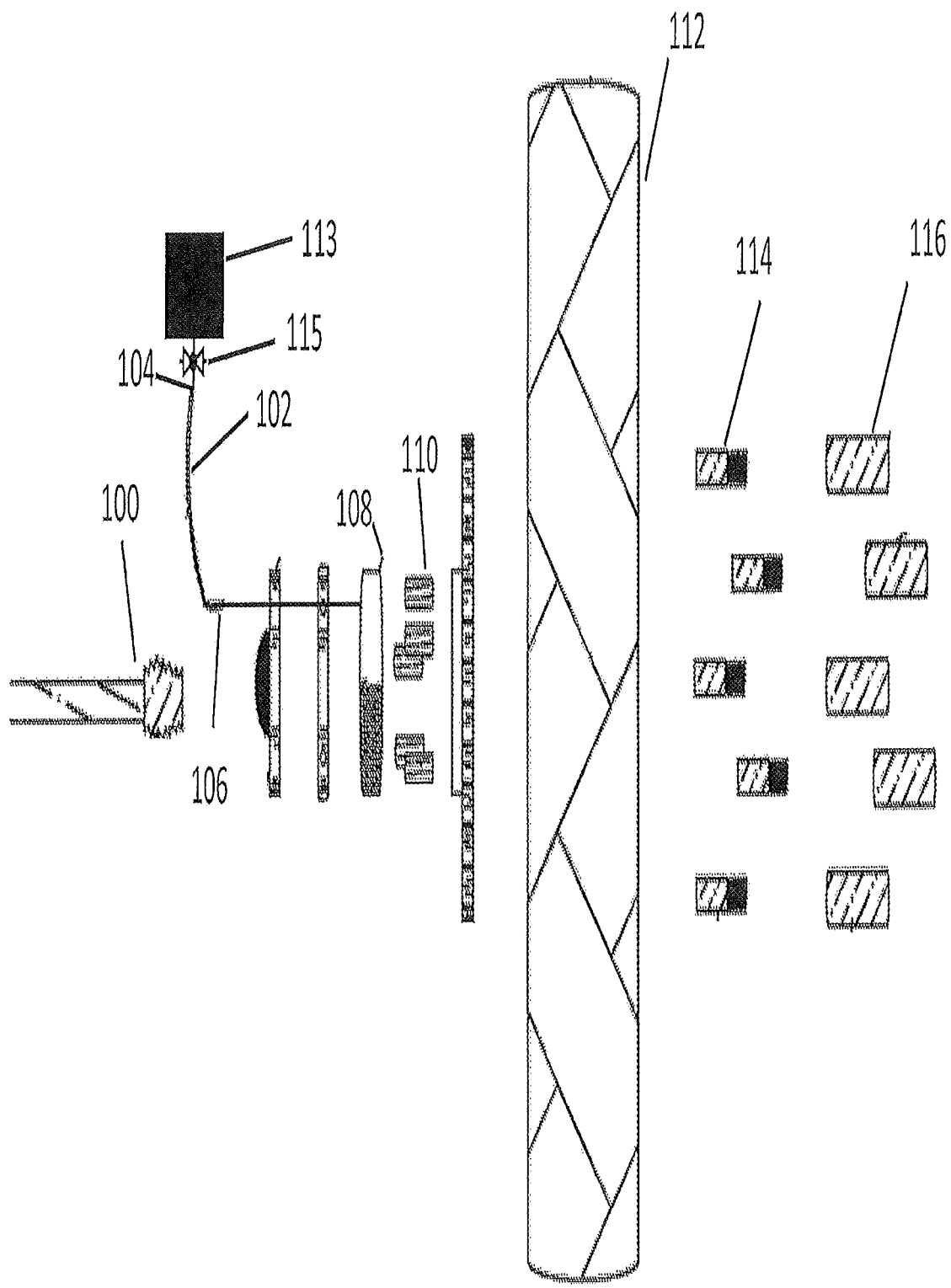
FIG. 1 schematically illustrates in cross sectional exploded view a hydraulically actuated embodiment of an automatic tire replacement apparatus and associated car elements.
Figure 6:
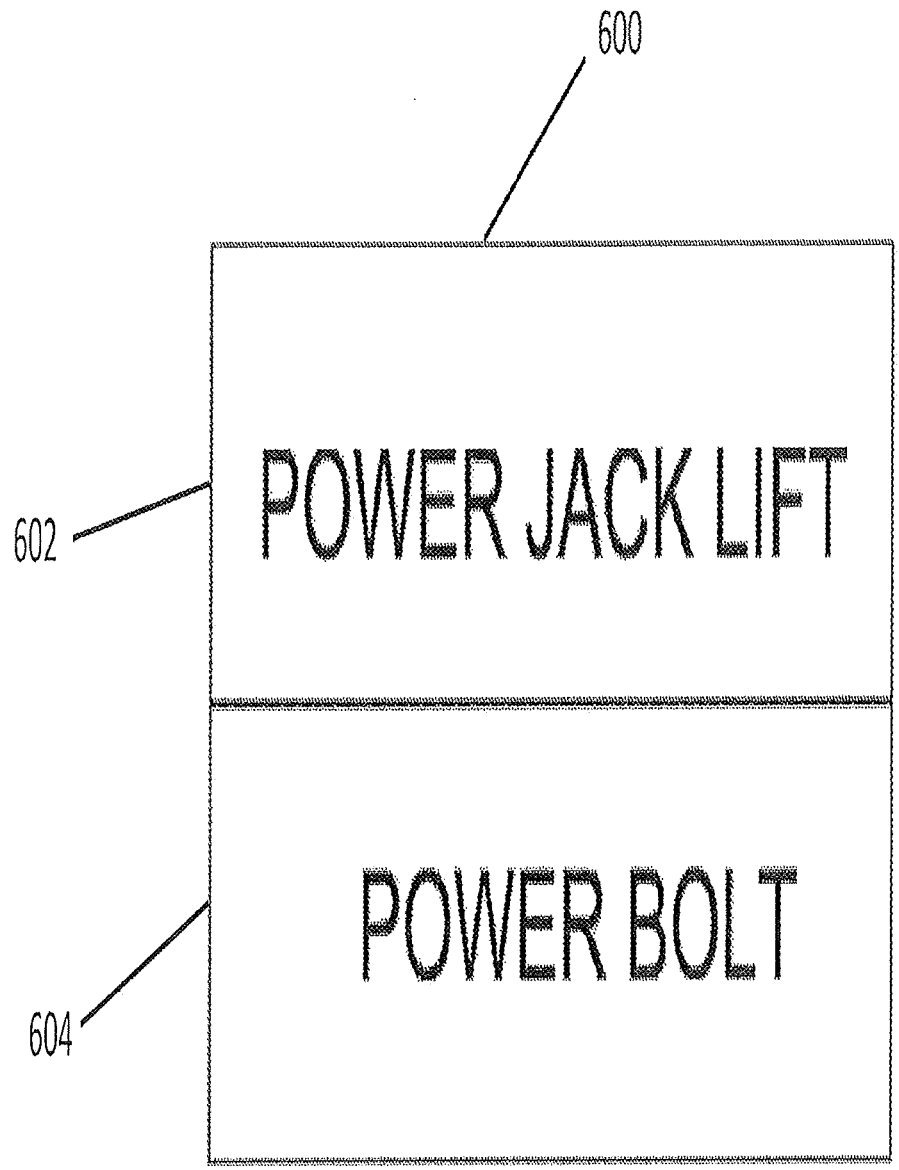
FIG. 6 illustrates a touch screen used to control functions of the apparatus for automatically replacing a tire.

FIG. 1 illustrates in a cross section an axle 100 for a vehicle. The vehicle is typically a transportation vehicle, such as a passenger automobile, truck or bus. A hydraulic fluid line 102 having a first end 104 and a second end 106 connects to a hydraulic fluid retainer 108 and to a plurality of hydraulic pistons 110. The hydraulic pistons are symmetrically arranged around an axis of a wheel 112. An exemplary number of pistons is five. The wheel 112, a set of five power rods 114 and a set of five power bolts 116 are aligned with the hydraulic pistons 110. The hydraulic fluid line 108 connects at the first end 104 to hydraulic fluid reservoir 113 that includes an actuator 115. Opening actuator 115 inputs hydraulic fluid into the automatic tire replacement apparatus. Further the hydraulic fluid reservoir 113 and the hydraulic fluid retainer 108 include actuators that control the flow of the hydraulic fluid. In embodiments, the apparatus for automatically replacing a tire may be actuated electronically using a user input device such as a touch screen monitor, as shown in FIG. 6, or manual controls.

Figure 2:
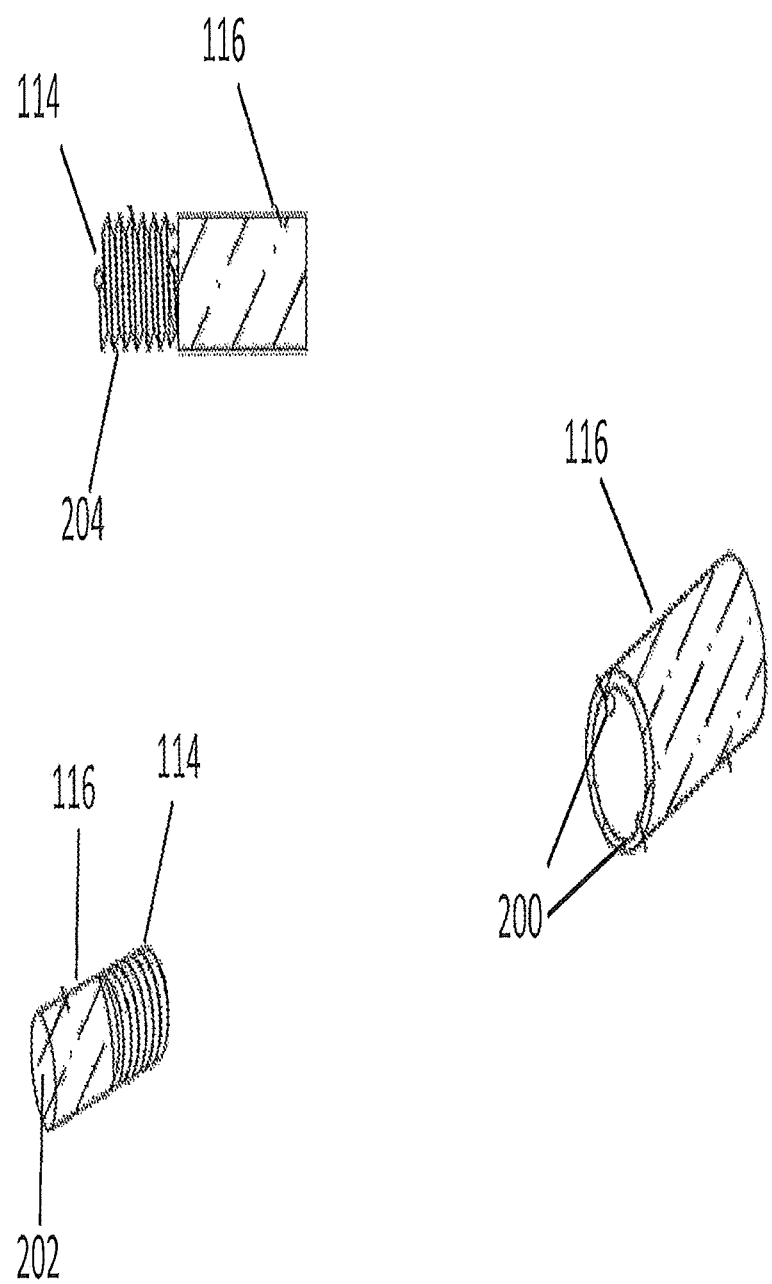
FIG. 2 illustrates a threaded power bolt with locking pins and a threaded power nut with retractable pins configured to engage the threaded power bolt.

FIG. 2. illustrates an embodiment of a power rod 114 connected to a power bolt 116, and illustrates the power bolt w116 with inward facing locking pins 200 extended. In embodiments, inward facing locking pins 200 are extended and retracted by a locking button 202 on the power bolt 116. In embodiments the locking pins 200 are used to engage the power bolt 116 to the power rod 114 and may be manually disengaged to remove the power bolt 116 from the power rod 114. Further, when the power bolt 116 is held in a rotationally stationary position, the relative horizontal movement of a power rod 114 with a spiral thread 204 creates rotational movement effective to fasten a power rod 114 to a power bolt 116.

Figure 3:
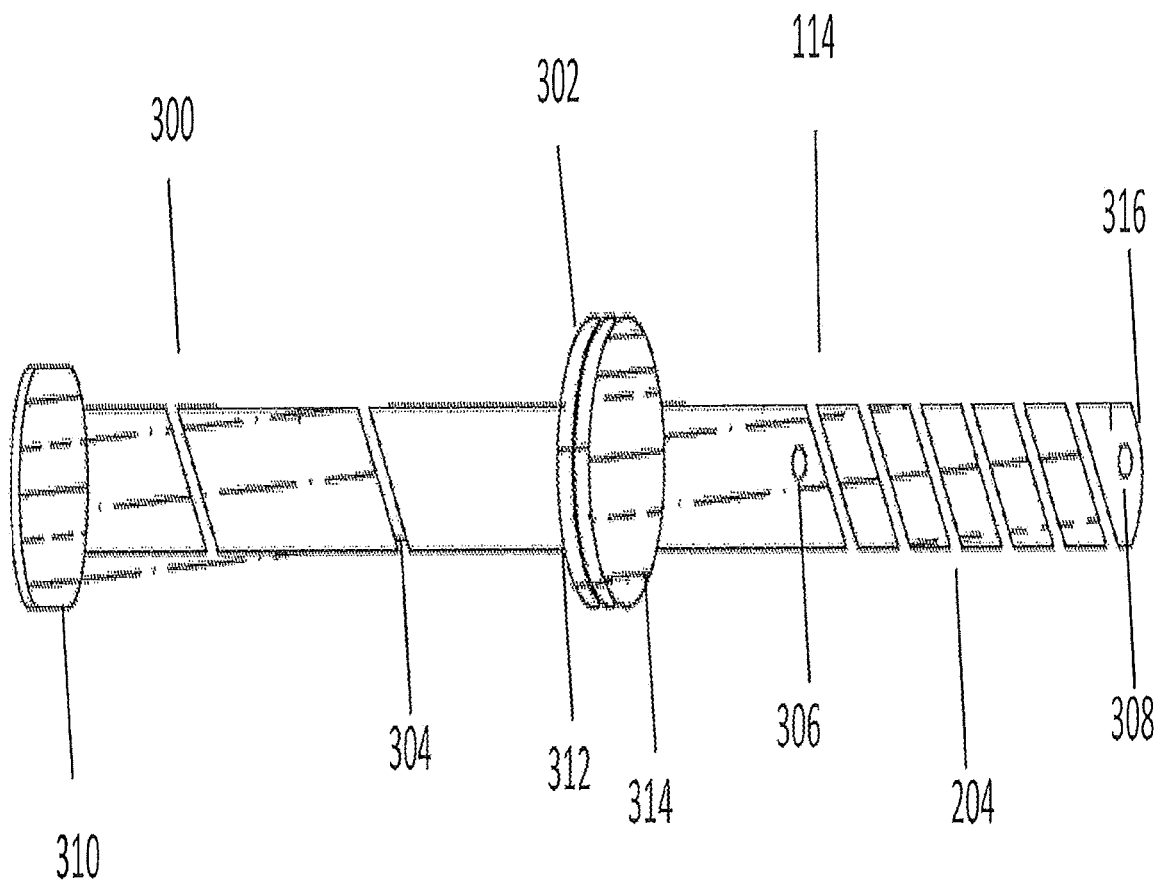
FIG. 3 illustrates a cross sectional view of the piston rod, piston, and power rod.

FIG. 3. illustrates an embodiment of a piston rod 300 having a first end 310 and a second end 312, a piston 302, and a power rod 114 having a first end 314 and a second end 316. In embodiments the piston rod may include a piston rod thread 304 that may be utilized similarly to the spiral thread 204. In embodiments the power rod 114 may include an outer lock notch, 308 and an inner lock notch 306, where a power bolt 116 may engage with the power rod spiral thread 204 via power bolt locking pins 200. In embodiments hydraulic fluid pressure may be applied to the piston 302 in either direction to translate the piston rod 300 and power bolt 116 in a horizontal direction. In embodiments, if the piston rod thread 304, or the spiral thread are engaged with a stationary object the power bolt and the piston rod may rotate as they are translated horizontally.

Figure 4:
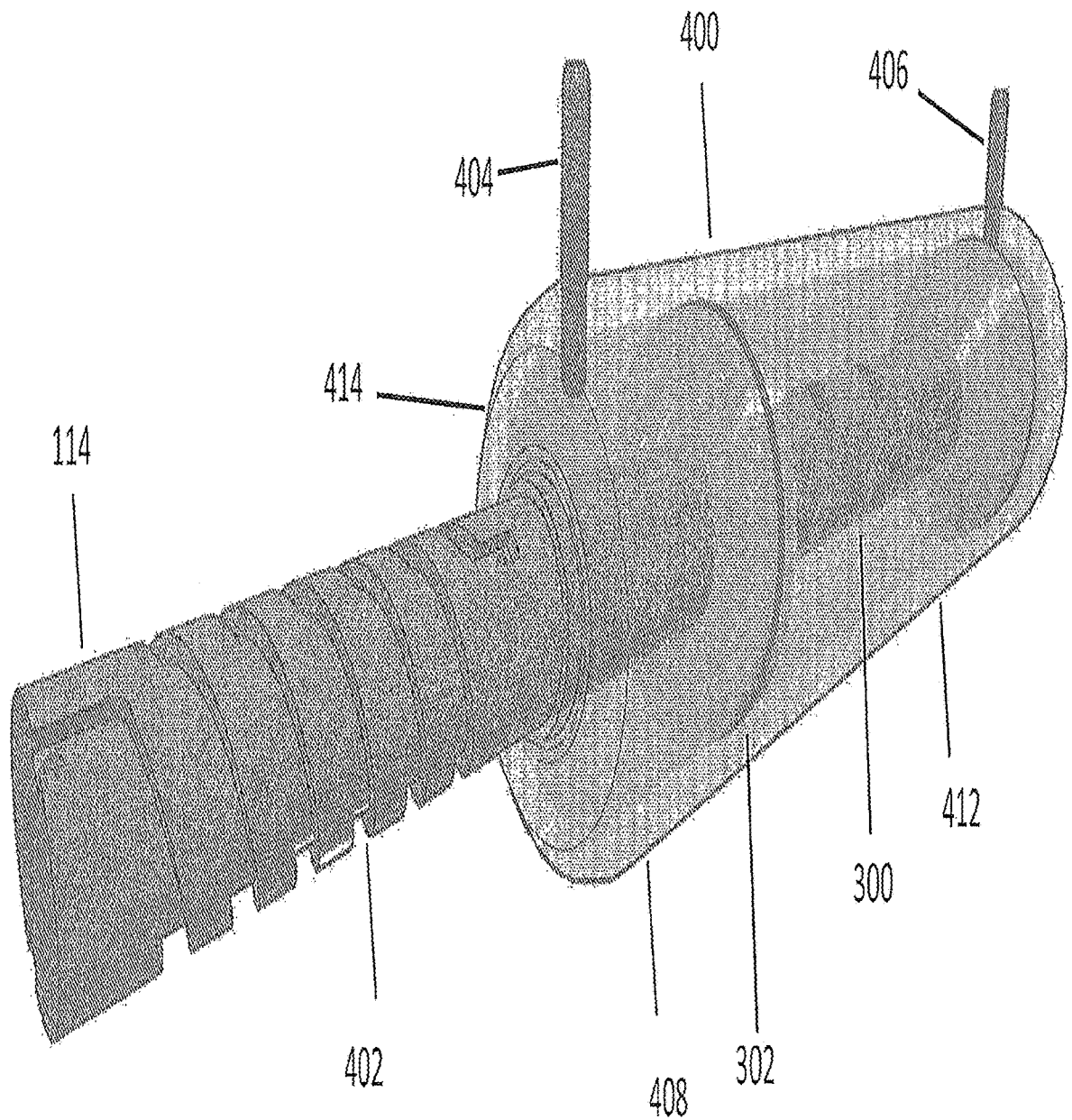
FIG. 4 illustrates a perspective cut away view of the hydraulic piston and the power rod.

FIG. 4. illustrates an embodiment of a power rod 114 connected to a hydraulic piston 400 having a hollow barrel 414, a piston 302 a piston rod 300, an inner volume 412, an outer volume 408 an inner piston actuator 406 and an outer piston actuator 404. In embodiments, the inner piston actuator 406 may release hydraulic fluid into the inner volume 414 to act on the piston 302 and move the piston rod 300 and the power rod 114 outwardly in a horizontal direction while the outer piston actuator 404 may simultaneously release hydraulic fluid from the outer volume 408 into the hydraulic fluid retainer. Similarly in embodiments, the outer piston actuator 404 may release hydraulic fluid into the outer volume 408 to act on the piston 302 and move the piston rod 300 and the power rod 114 inwardly while the inner piston actuator 406 may release hydraulic fluid from the outer volume into the hydraulic fluid retainer. Hydraulic fluid may be any fluid capable of being pressurized including oil and air.

Figure 5:
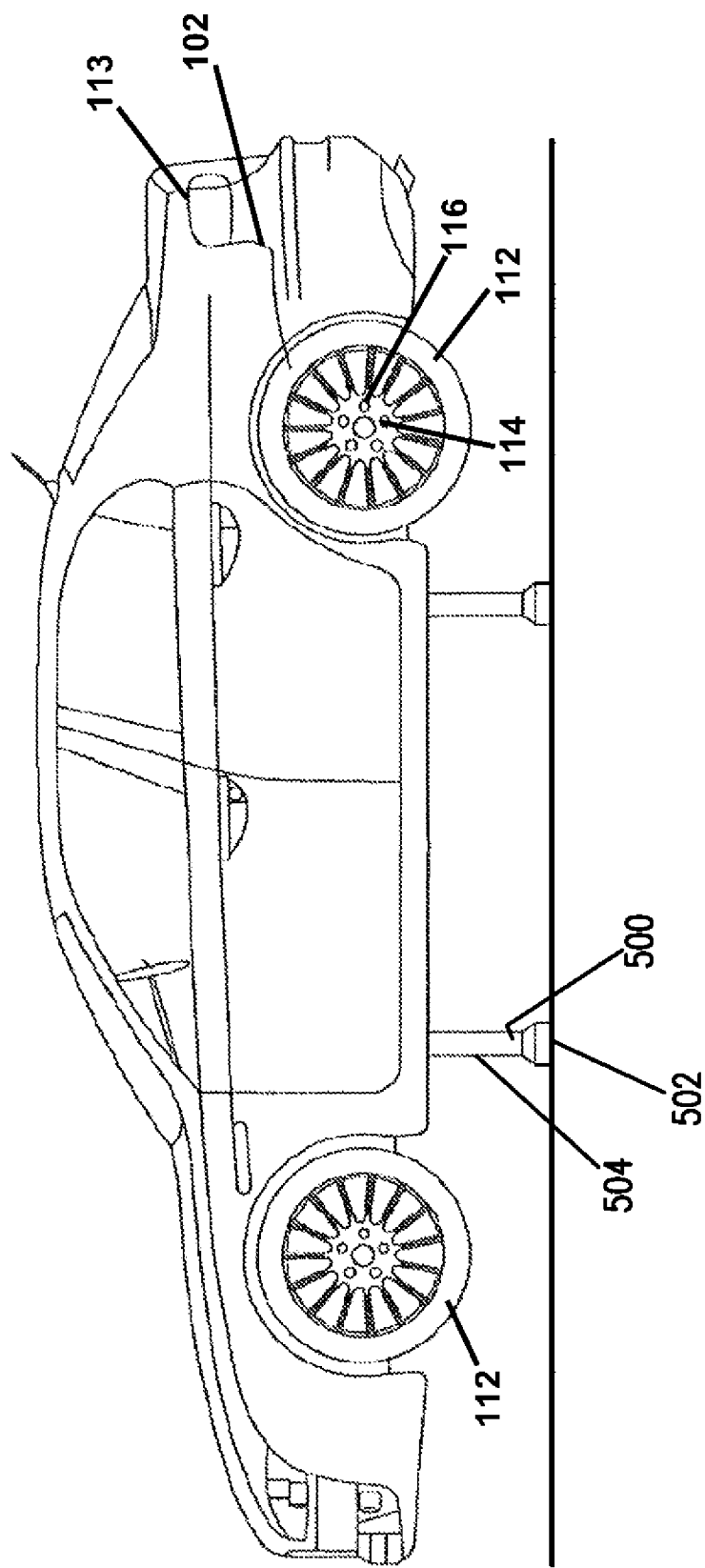
FIG. 5 illustrates a cross sectional view of a car with the automatic lift system installed and extended.

FIG. 5. illustrates a car with an extended automatic power jack 500. In embodiments the automatic car jack may comprise four bases 502 that collapse into the chassis of a vehicle. The bases may be pressurized by hydraulic fluid to extend outwardly from the chassis and elevate a motor vehicle. In embodiments a jack 500 may include an extending body 504 and a base 502. In embodiments the power jack 500 may be activated to lift a motor vehicle such that the tires no longer touch the ground, and the power jack 500 may be deactivated to lower a motor vehicle such that the tires touch the ground.

FIG. 6 illustrates a touch screen 600, or other control system with options to actuate the power jack lift 602 or the power bolt 604.

Figure 7:
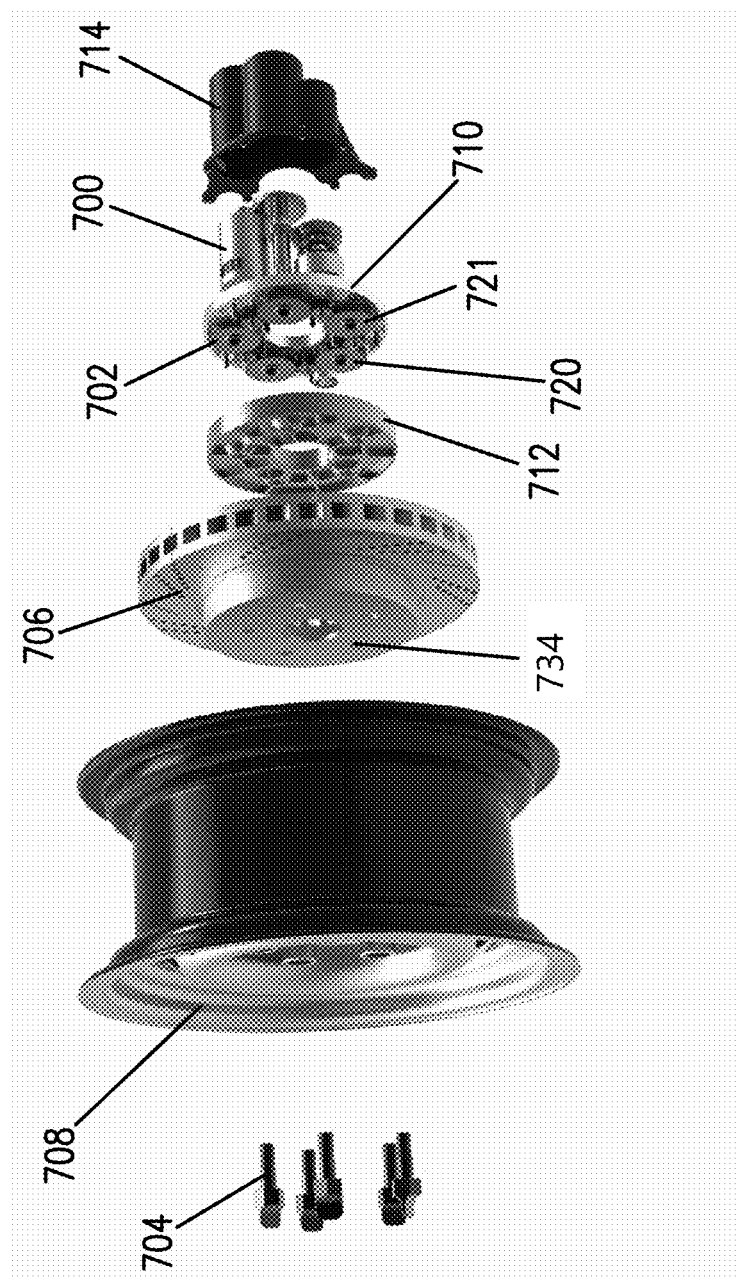
FIG. 7 illustrates in exploded perspective exploded view an electrically actuated embodiment of the automatic tire replacement apparatus.

FIG. 7 is an exploded perspective view of an embodiment of an apparatus for automatically replacing a tire that is actuated by an electric motor 700 that drives a planetary gear train 702 that engages power bolts 704. The power bolts 704 extend through apertures 734 in platen 706 and gear housing cover 712 to engage threaded apertures 720 extending into bolt locking gears 721 thereby holding wheel 708 in place. The electric motor 700 is configured to rotate the gears of the planetary gear train 702 in both a clockwise direction and a counterclockwise direction. In this way, the power bolts may be loosened to remove the wheel 708 or tightened when the wheel 708 is replaced.

The electric motor 700 produces a torque sufficient to secure and release the power bolts 704. This torque is generally between 125 foot pounds and 175 foot pounds and preferably between 144 foot pounds and 173 foot pounds. The motor housing support 710, gear housing cover 712 and platen 706 are formed from a corrosion resistant material, such as cast magnesium, an aluminum alloy, steel, treated steel and a steel alloy. Further corrosion resistance is provided by an apparatus cover 714 that may be formed from a rigid plastic, anodized aluminum alloy or other corrosion resistant material.

Figure 8:
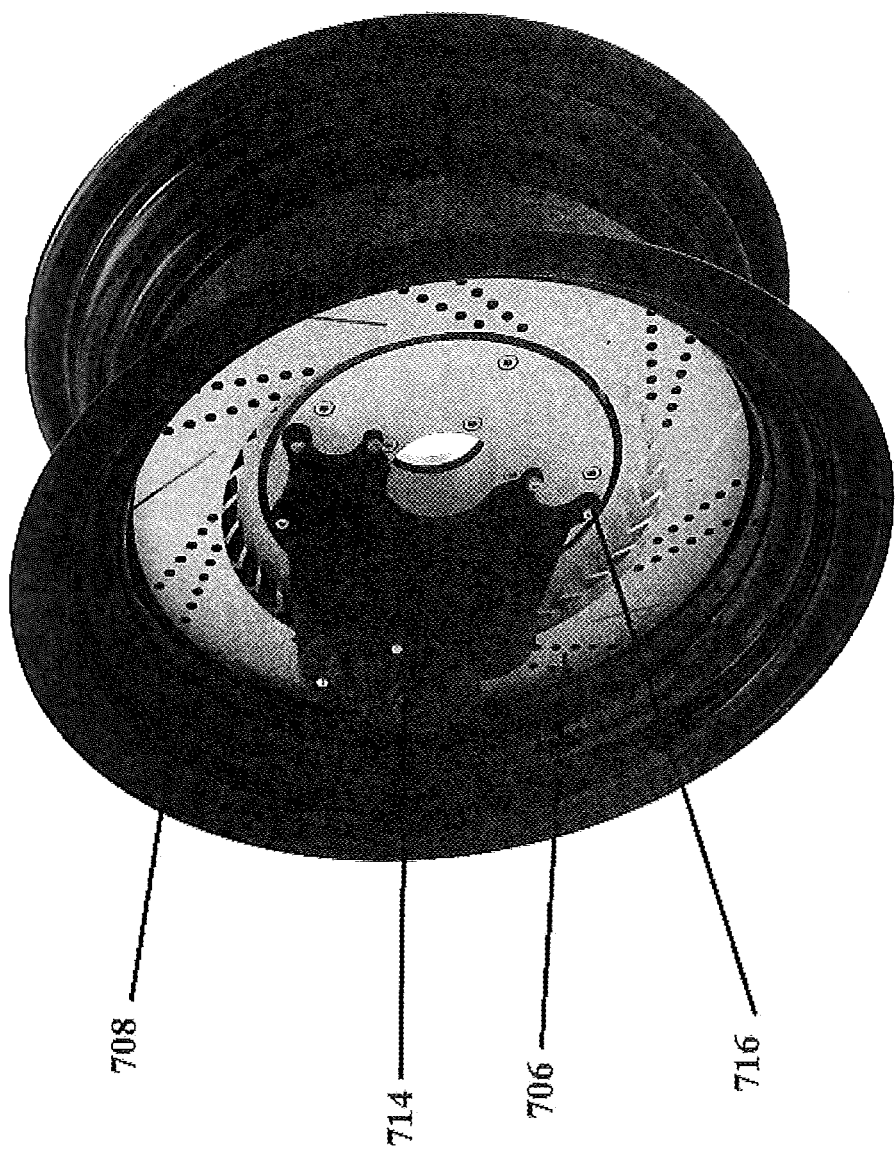
FIG. 8 is a perspective view of the electrically actuated embodiment of the automatic tire replacement apparatus mounted to a vehicle wheel.

FIG. 8 is a perspective view showing the apparatus encased within apparatus cover 714 affixed, such as by plurality of bolts 716, to platen 706 that is adjacent an inner wall of the wheel 708.

Figure 9:
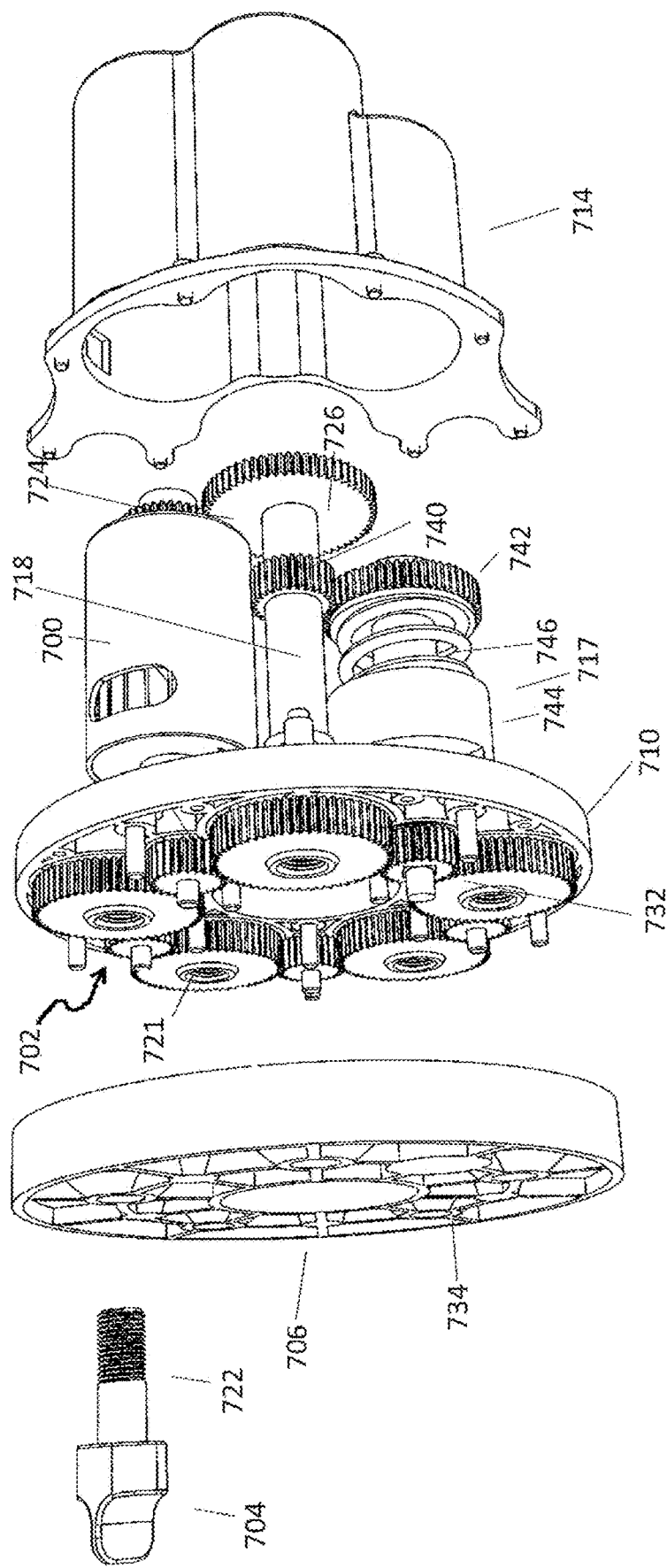
FIG. 9 illustrates is a cutaway view of the electrically actuated embodiment of the automatic tire replacement apparatus.

FIG. 9 is a perspective view illustrating the electric motor 700 engaging drive shaft 718 to rotate the gears of the planetary gear train 702. A threaded aperture 720 extends into the center of each bolt locking gear 721 that engages the threads 722 of a power bolt 704. Depending on the direction of rotation of the bolt locking gears 721, the power bolt 704 will either loosen or tighten. The electric motor also engages a transfer cylinder 717 that controls the amount of tightening and loosening of power bolts 704.

Figure 10:
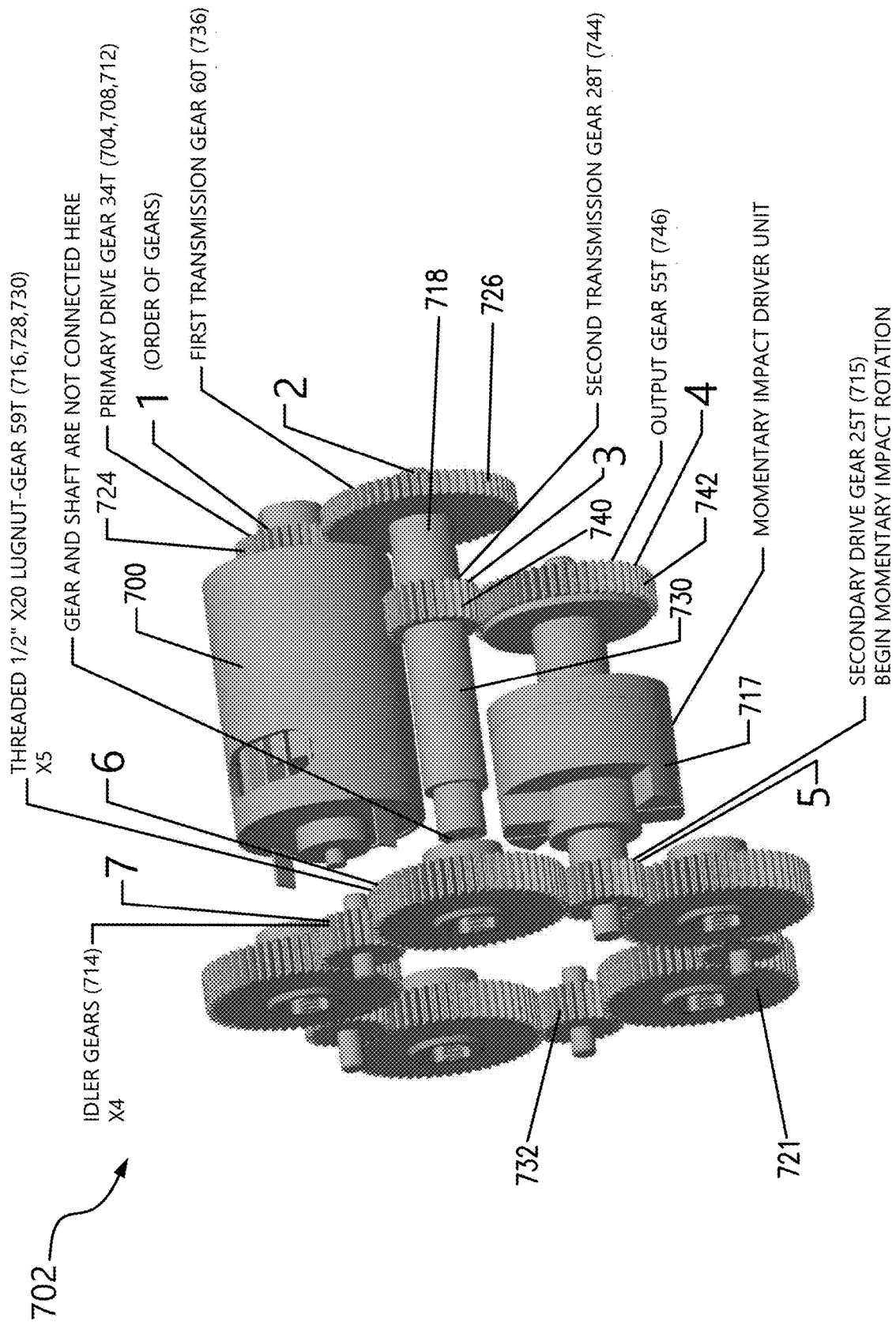
FIG. 10 illustrates in perspective view a gear arrangement for the electrically actuated embodiment of the automatic tire replacement apparatus.

The gearing system is further illustrated in FIG. 10. The electric motor 700 transfers rotational motion to a primary drive gear 724 that engages a first transmission gear 726 affixed adjacent a first end 728 of the drive shaft 718. Rotation of the primary drive gear causes rotation of the first transmission gear thereby rotating drive shaft 718. An opposing second end 730 is affixed to one of the bolt locking gears 721 such that rotation of the drive shaft 718 causes rotation of the bolt locking gear 721 rotating the gears of the planetary gear train 702. To achieve the desired torque and rotation to engage and disengage power bolts, the bolt locking gears 721 have an exemplary diameter that ranges between 1.5 inches and 2.5 inches and is preferably between 1.9 inches and 2.0 inches. Each bolt locking gear 721 nominally has 60 gear teeth. Idler gears 732 provide proper spacing for the bolt locking gears and transfer rotational motion to an adjacent bolt locking gear. These idler gears have an exemplary diameter between 1.0 and 1.5 inches and preferably between 1.2 inches and 1.3 inches. Projecting from the outer edge of the idler gears 732 are, for example, 34 gear teeth.

Figure 11:
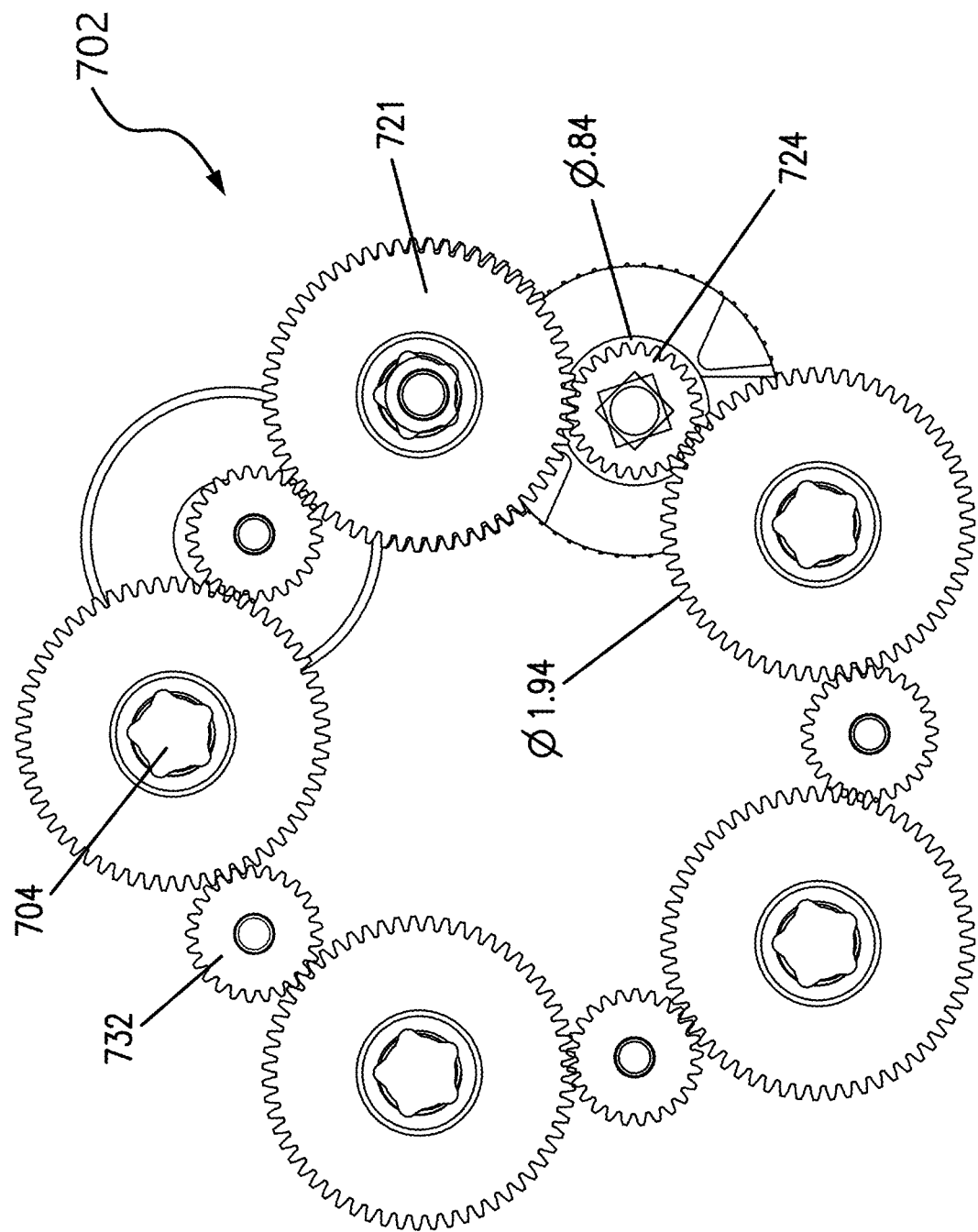
FIG. 11 is a top view of a planetary gear train for the electrically actuated embodiment of the automatic tire replacement apparatus.
Figure 12:
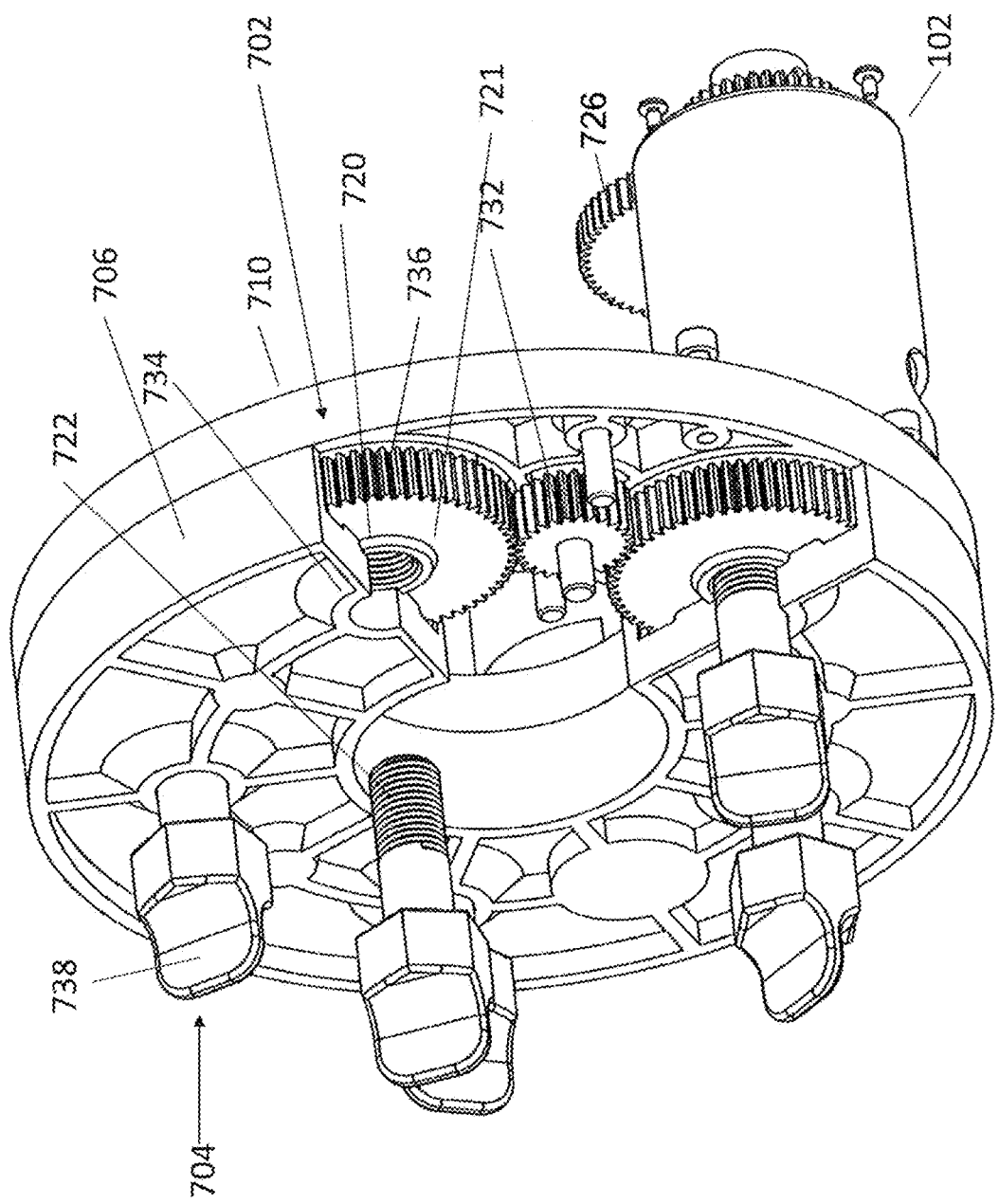
FIG. 12 is a partially broken perspective view of the gear arrangement for the electrically actuated embodiment of the automatic tire replacement apparatus.

Referencing FIGS. 11 and 12, The primary drive gear 724 engages a bolt locking gear 721 that is an element of the planetary gear train 702. Each bolt locking gear 721 has a diameter of between 1.5 inch and 2.0 inch and a preferred diameter of between 1.9" and 2.0". Each bolt locking gear nominally has 59 gear teeth. The planetary gear train 702 has sufficient bolt locking gears 721 to engage each power bolt 704. For a passenger automobile, that is typically between four and six bolt locking gears 721. The planetary gear train 702 also includes idler gears 732 positioned between bolt locking gears 721 so that the bolt locking gears 721 align with through holes 734 extending through platen 706. The power bolts 704 extend through the through holes 734 of the platen 706 and engage the threaded apertures 720 formed in bolt locking gears 721. The idler gears 732 have a diameter ranging between 0.5 inch and one inch and preferably between 0.8" and 0.9". The directional gears nominally have 25 gear teeth.

The bolt locking gears 721 may be seated in cylindrical recess 736 formed in motor housing support 710. The motor housing support 710 may be a disk having a diameter that ranges between 5 inches and 8 inches and is preferably between 6" and 7". The motor housing support 710 in combination with the platen 706 is sized to encapsulate the planetary gear train 702.

Each bolt locking gear 721 includes a threaded aperture 720 having a diameter and thread pitch effective to receive and engage the threaded portion 722 of a power bolt 704. Both the diameter and thread pitch may be English units or metric units dependent on manufacturer. Nominally, the diameter of the threaded aperture is between 0.4 inch and 0.6 inch, and preferably, that diameter ranges between 0.45" and 0.55" with the spiral thread formed on the wall of the bore 720. The power bolts 704 with a bolt spiral thread 722 interlock with the spiral thread in each threaded aperture 720. Each power bolt 704 may also have a power bolt cap 738, which may be shaped in a rigid geometrical shape such as a standard tire lug nut shape to enable removal with a conventional lug wrench if electrical power is not available or unsafe to use. For example, if the vehicle battery has been damaged in an accident.

In some embodiments, each power bolt 704 is made at least partially of magnetic material and have a magnetic tip.

Returning to FIGS. 9 and 10, primary drive gear 724, which may have a diameter that ranges between one inch and 1.5 inches and preferably between 1.2" and 1.3", nominally has 34 gear teeth. The primary drive gear 724 engages first transmission gear 726 on the drive shaft 718. The primary drive gear 724 is operatively connected to a second transmission gear 740 that engages an output gear 742 that drives momentary impact drive 717.

The second transmission gear 740 drives the output gear 742 which may have a diameter that ranges between 0.5 inch and 1.5 inches and is preferably between 0.9" and 1.0 inch and nominally has 28 gear teeth. The output gear 742 is connected to the primary impact drive transfer 717 and is concentrically connected to a locking cylinder 744 encasing a locking coil 746. The locking coil 746 has a number of windings that typically ranges between 3 and 6. During tightening of the power bolts 704, the locking cylinder 744 rotates until an edge of the locking coil 746 contacts a stop that may be grooves that interlock with the locking coil 746 preventing overtightening of the power bolts 704.

The electric motor 700 drives the planetary gear train 702 in either a clockwise or a counterclockwise direction, rotating the bolt locking gears 721, to either tighten or loosen the power bolts 704. Alternatively, the electric motor may be able to reverse direction of rotation or it may turn in one direction and different gearing arrangements be engagable to control the direction of rotation of the locking gears 721. The electric motor 700 also drives rotation of the locking coil 764 to stop rotation of the bolt locking gears 721 at the point of power bolt 704 tightening to prevent overtightening. The electric motor 700 is also connected to a power source 750 as also shown in FIG. 14.

Figure 13:
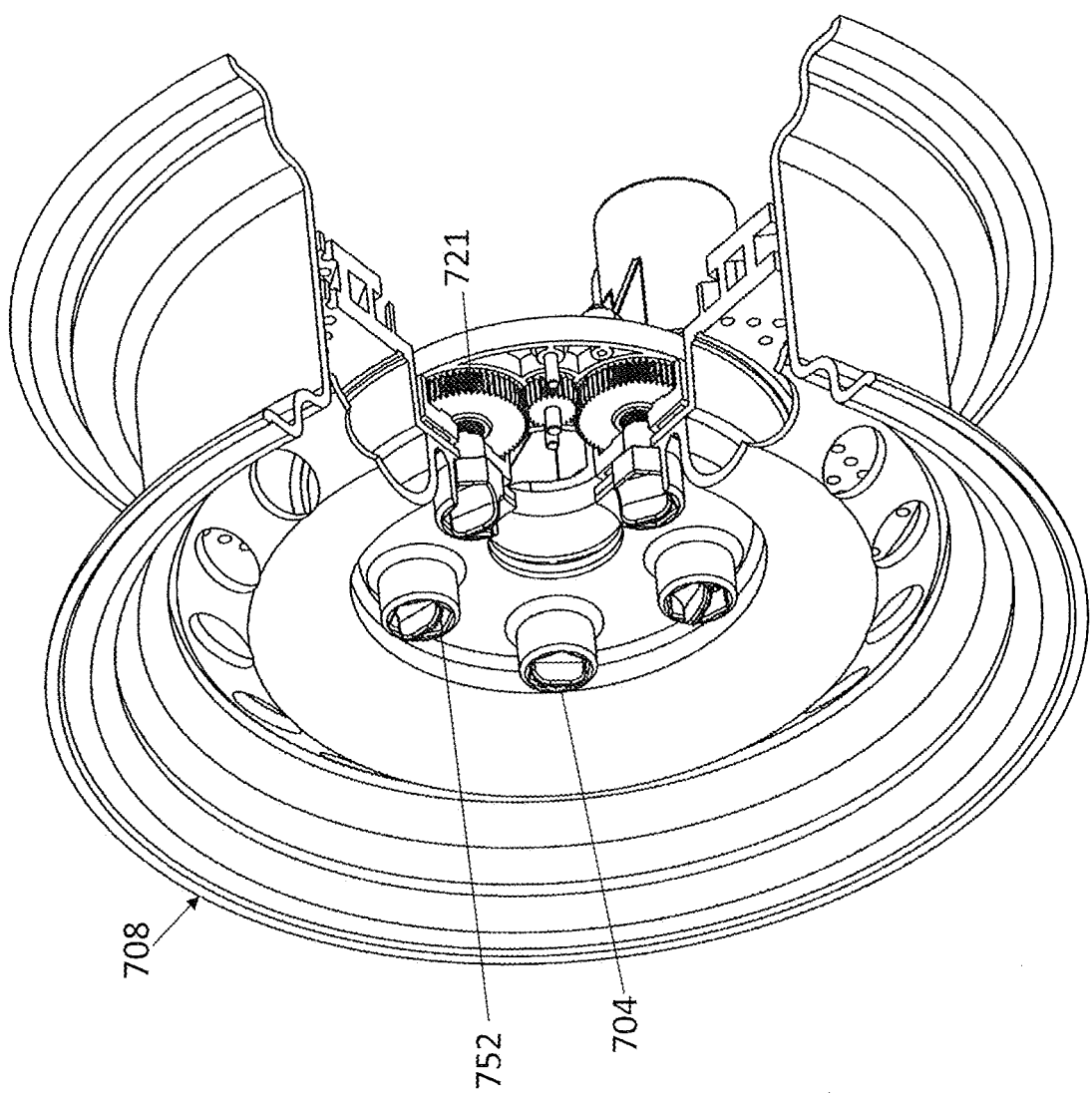
FIG. 13 illustrates a partially broken perspective view of the electrically actuated embodiment of the automatic tire replacement apparatus mounted to a vehicle wheel.

FIG. 13 illustrates the apparatus for automatically replacing a tire mounted to a wheel 708. Five power bolts 704 are illustrated passing through apertures in the wheel 708 and engaging bolt locking gears 721. Power bolt caps 752 are optionally disposed on a surface of the wheel 708, such that each power bolt 704 fits into the power bolt cap 752 when engaged with a bolt locking gear array 721. The power bolt caps 752 hold each power bolt 704 in place, allowing the power bolt 704 to only translate toward and away from its respective bolt locking gear 721. The power bolt caps 752 make manual removal of the power bolts 704 more difficult as a theft deterrent.

Figure 14:
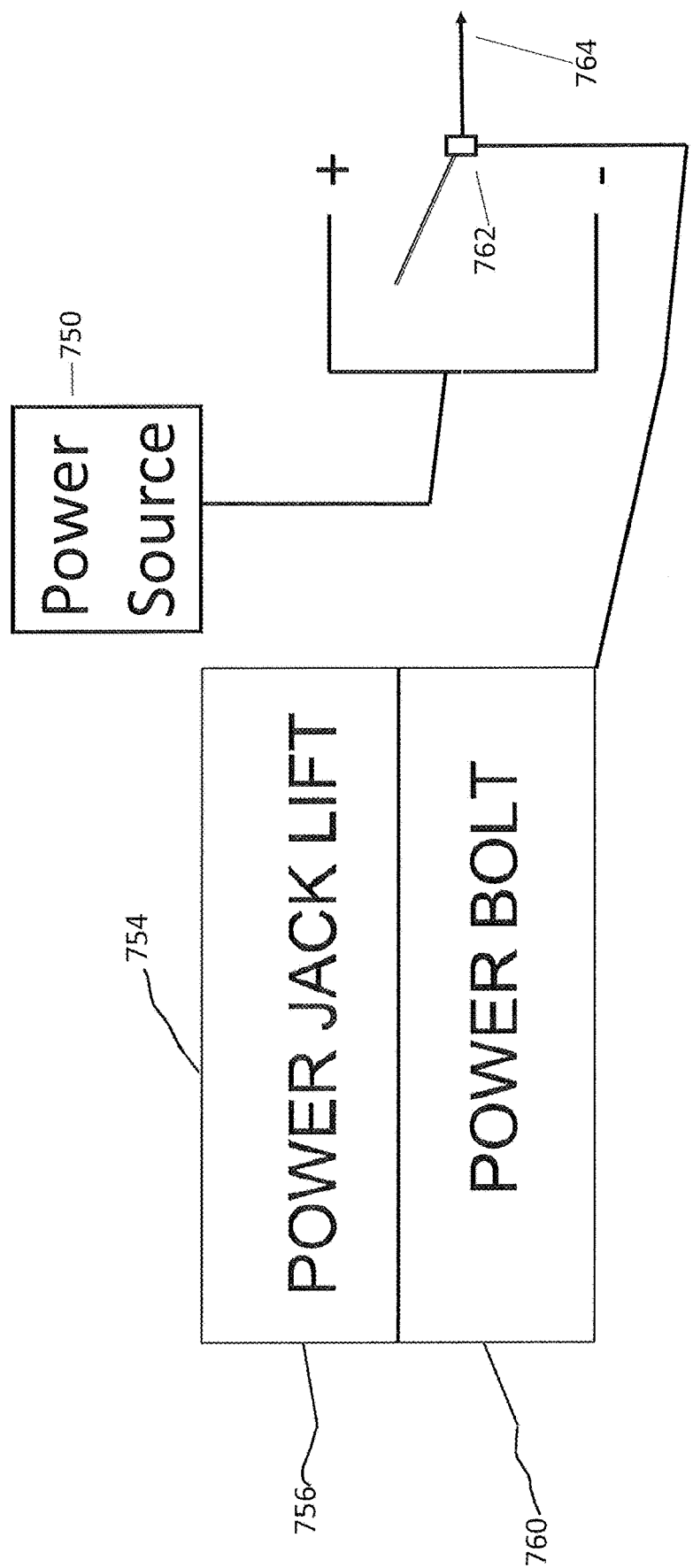
FIG. 14 schematically illustrates an actuation system for the electrically actuated embodiment of the automatic tire replacement apparatus.
Figure 15:
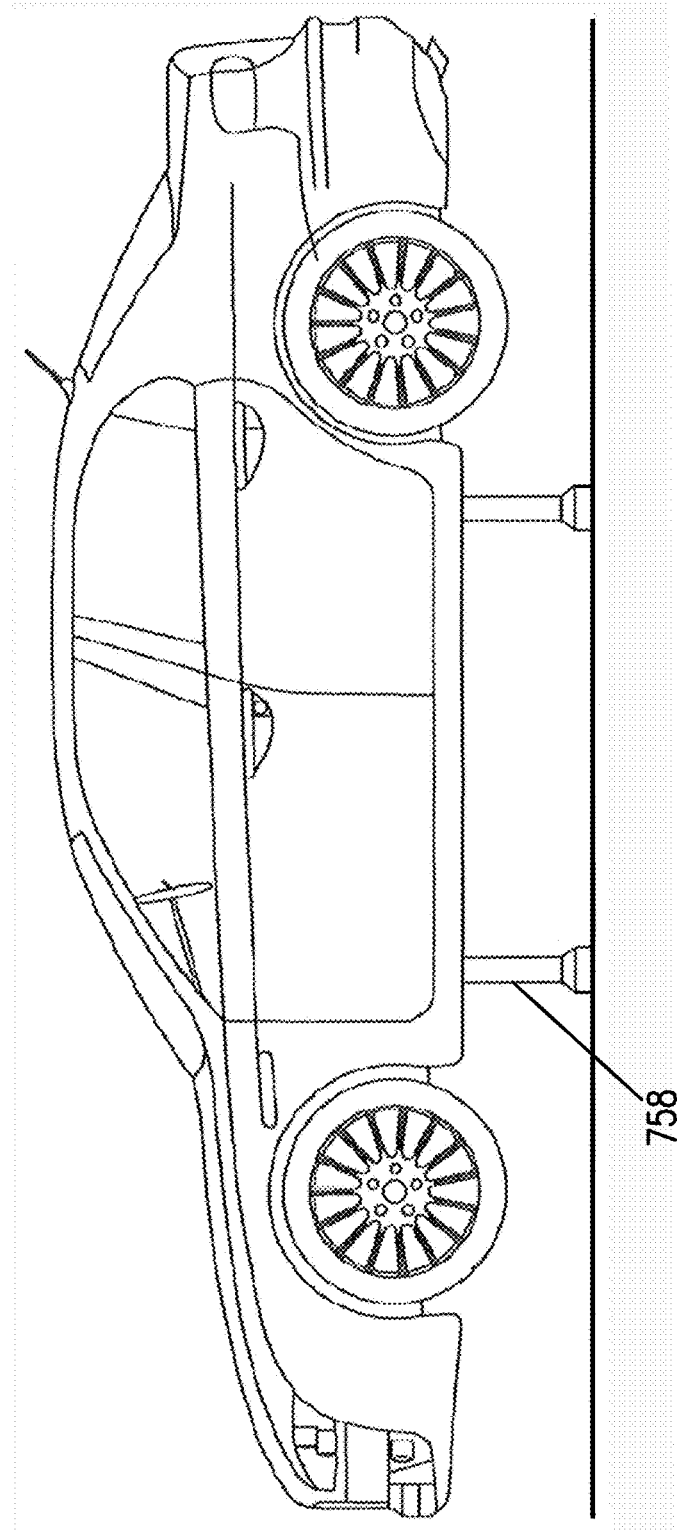
FIG. 15 is a side-perspective view of an automobile raised on a hydraulic jack system.

FIG. 14 illustrates a touch screen 754 to control the automatic tire replacement apparatus. The touch screen 754 may be a display on the vehicle dashboard of an application on a separate device, such as smart phone or personal computer communicating with the automatic tire replacement apparatus by a known wired or wireless protocol. The touch screen 754 may display a lift control 756 to activate a power jack 758 mounted inside the vehicle (FIG. 15). The touch screen 754 may also display a power bolt control 760 controlling the loosen and tighten the power bolt functions. FIG. 14 further schematically illustrates the touch screen 754 communicating with an electric switch 762 configured to provide either positive or negative voltage from the power source 750 to an input 764 to the electric motor 700 (FIG. 9). The power source 750 may be a battery or generator on the vehicle. Alternative, the power source 750 may be an external power source separate from the car power system. The electric switch 752 may be engaged with a positive voltage or a negative voltage from the power source 750 effective to rotate the electric motor in a clockwise direction or a counterclockwise direction.

The invention claimed is:
1. A tire replacement apparatus comprising:
an electric motor having a drive shaft and a first gear concentrically connected to the drive shaft where the first gear connects to a symmetrical bolt locking gear array having several bolt locking gears arranged such that each bolt locking gear rotates in a same direction as the first gear rotates;
each bolt locking gear having a cylindrical through bore at its center, a wall of the cylindrical through bore having an inner spiral thread formed thereon which engages a power bolt having an outer spiral thread sized to interlock with the inner spiral thread.

2. The tire replacement apparatus of claim 1 wherein each bolt locking gear is arranged in a planetary gear array.

3. The tire replacement apparatus of claim 2 wherein the motor connects to a locking mechanism.

4. The tire replacement apparatus of claim 3 wherein the locking mechanism is a coil locking mechanism.

5. The tire replacement apparatus of claim 4 wherein the electric motor is connected to a transfer gear, which connects to the coil locking mechanism.

6. The tire replacement apparatus of claim 5 wherein each bolt locking gear is secured on an assembly frame.

7. The tire replacement apparatus of claim 6 wherein the power bolt has a magnetic tip.

8. The tire replacement apparatus of claim 7 further comprising a gear assembly cover.

9. The tire replacement apparatus of claim 8 further comprising a housing.

10. The tire replacement apparatus of claim 9 further comprising an automatic power jack.

11. The tire replacement apparatus of claim 10 further comprising five bolt locking gears and five power bolts.

12. The tire replacement apparatus of claim 11 further comprising an electrical power source connected to the motor, and an electrical switch which connects to a positive electrical voltage source and a negative electrical voltage source.

13. The tire replacement apparatus of claim 12 further comprising a touch screen interface, electrically connected to and controlling the electrical switch.

14. The tire replacement apparatus of claim 13 further comprising a manual rotation bolt.

\* \* \* \* \*